United States Patent [19]
Blatt

[11] 3,885,776
[45] May 27, 1975

[54] VARIABLE CUSHION SHOCK ABSORBER

[76] Inventor: Leland F. Blatt, 31915 Groesbeck Highway, Fraser, Mich. 48026

[22] Filed: May 8, 1974

[21] Appl. No.: 468,018

[52] U.S. Cl. .................. 267/34; 188/289; 188/315; 213/43; 267/139
[51] Int. Cl. ............................................ B60g 11/56
[58] Field of Search ........... 188/282, 289, 299, 315, 188/317, 318, 322; 267/139, 34; 213/43, 223

[56] References Cited
UNITED STATES PATENTS

| | | | |
|---|---|---|---|
| 3,215,283 | 11/1965 | Shaver | 188/289 X |
| 3,666,256 | 5/1972 | Ellis et al. | 188/322 X |
| 3,797,615 | 3/1974 | Stembridge | 188/315 X |

FOREIGN PATENTS OR APPLICATIONS

| | | | |
|---|---|---|---|
| 518,063 | 11/1955 | Canada | 188/289 |

*Primary Examiner*—George E. A. Halvosa
*Attorney, Agent, or Firm*—Cullen, Settle, Sloman & Cantor

[57] ABSTRACT

A shock absorber has a body with a bore and counterbore divided by a piston and piston rod. A tapered tubular metering pin is nested within the blind end of the body and extends into the piston and piston rod. The bore is completely filled with fluid as is the bore in the piston rod and metering pin. A spring is anchored in said metering pin maintaining the piston rod in the extended rest position. A float valve on the piston is retracted when the piston rod is extended from the body. Said piston rod is adapted to be engaged by a moving body to be decelerated and stopped. A variable orifice element in the blind end of the bore directs liquid to the hollow metering pin, through the piston and through radial passages into the counterbore which is partially filled with a foam material. The metering pin is tapered so that as the piston is forced into the liquid, the flow of energy-absorbing liquid to the opposite chamber is gradually decreased as the piston moves rearward. On the return of the load, the piston is biased outwardly by a spring, a float valve on the piston opens, and unmetered fluid returns to the bore by displacement of the piston and piston rod.

3 Claims, 4 Drawing Figures

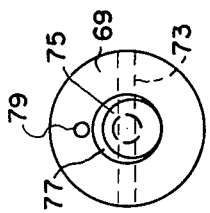
FIG. 1
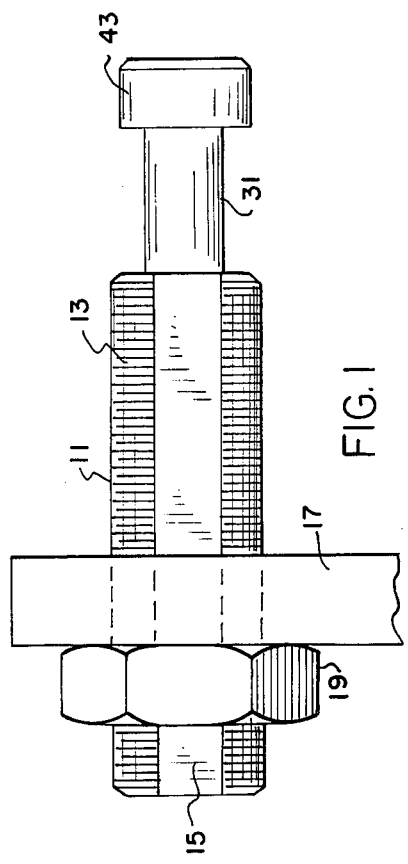
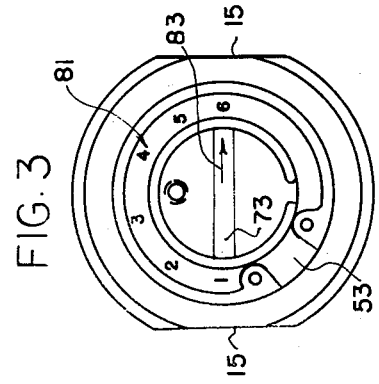
FIG. 3
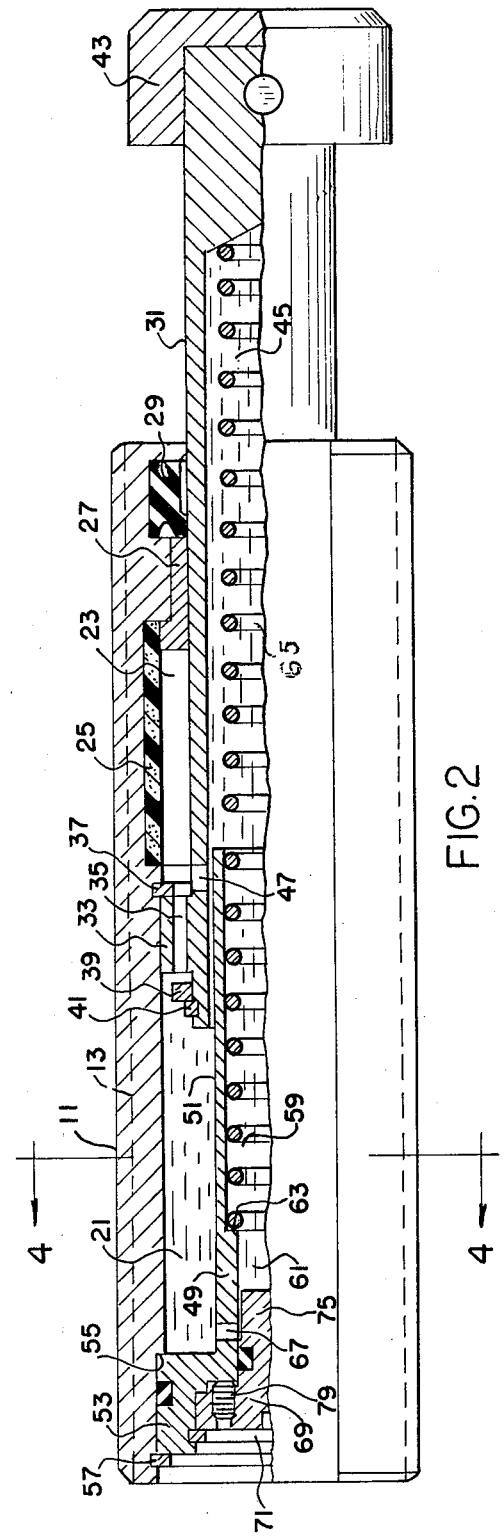

VARIABLE CUSHION SHOCK ABSORBER

BACKGROUND OF THE INVENTION

The purpose of the shock absorber is to dissipate the kinetic energy produced by moving masses, to bring them to a smooth stop at the end of the stroke, or in a certain period of time. These applications are encountered in automatic machinery which have carriages moving back and forth with equipment attached thereon of considerable mass coupled to a mechanism having no mechanical disadvantage at the end of the travel to stop the masses smoothly.

Most shock absorbers are built for a particular shock load specified in absorbtion inch pounds of force. The present shock absorber of a certain size can be used by adjusting across a broad range from maximum to minimum flow adjustment. This is accomplished by increasing or decreasing the liquid flow across a variable orifice.

BRIEF DESCRIPTION OF THE INVENTION

It is an object of the present invention to provide an improved shock absorber whereby upon engagement of a load with the piston and piston rod assembly, which is spring-biased by outwardly, exerting force on the piston rod, there will be a metered transfer of liquid from one chamber to a secondary chamber of the shock absorber with the extent of flow being regulated by a variable orifice metering device.

It is another object to provide an improved shock absorber having a pair of chambers with a sleeve of resilient foam plastic in one of said chambers adapted to compress when said chamber is filled for maintaining a pre-load pressure on the liquid within said chamber, piston rod and metering pin.

It is another object to provide an improved metering pin so constructed as to progressively and gradually decrease the flow of metered fluid from a chamber as the piston retracts in said chamber gradually decelerating the load engaging the shock absorber and bringing same to an eventual smooth cushioned stop.

It is another object to provide an improved orifice element in conjunction with the metered transferred return of fluid from one chamber to another, wherein the return flow may be regulated between maximum and minimum flow.

These and other objects will be seen from the following specification and claims in conjunction with the appended drawing.

THE DRAWING

FIG. 1 is a side elevational view, actual size of the present shock absorber mounted upon a support, fragmentarily shown.

FIG. 2 is a longitudinal section thereof, double scale.

FIG. 3 is an end view thereof.

FIG. 4 is an end view of the orifice element taken in the direction of arrows 4—4 of FIG. 2.

It will be understood that the above drawing illustrates merely a preferred embodiment of the invention, and that other embodiments are contemplated within the scope of the claims hereafter set forth.

DETAILED DESCRIPTION OF THE INVENTION

Referring to the drawing, the present shock absorber is shown, actual size, FIG. 1, and, double size, FIG. 2. Said shock absorber includes the elongated body 11, which has an exterior thread 13 along its length and with a pair of opposed flats 15 upon its opposite sides. Said body is adapted for threading into any suitable support such as support 17, fragmentarily shown and anchored in position by jam nut 19.

Said body has a bore 21 corresponding to its blind end and a counterbore 23. A suitable resilient foam plastic liner 25 is nested within said counterbore, preferably constructed of polyurethane foam.

Within counterbores formed within said body, FIG. 2, are nested bushing 27 and the rod seal 29 adapted to cooperatively receive piston rod 31. Said rod has on one end the piston 33 having a series of axial bleed passages 35 which interconnect bores 21 and 23.

Snap ring 37 is anchored in the body at the end of bore 21 for limiting outward movement of piston 33 which separates said bore and counterbore. Upon a reduced portion of said piston there is slidably mounted the float valve 39, shown in FIG. 2 as spaced from the bleed passages 35, and anchored by snap ring 41.

End cap 43 is positioned over the outer end of said piston rod and suitably secured thereto. Said cap is adapted to be engaged by a moving load and in the functioning of the present shock absorber, is adapted to bring the load to a smooth and gradual and cushioned stop. Inward movement of the piston is limited by the cap 43 engaging body 11 so as to avoid contact of the piston with head 53 within the blind end of said body.

The piston rod has an elongated bore 45 in axial registry with a corresponding bore through piston 33. A series of radial ports 47 are formed through the wall of said piston rod adjacent said piston, providing liquid communication to counterbore 23 from the interior of said piston rod.

The tubular metering pin 49 is tapered upon its outer surface at 51, with gradually reduced diameter towards its free end, and includes an enlarged head 53 which is sealed within one end of said body and bears against shoulder 55 and is secured in position by the snap ring 57. FIG. 2.

The metering pin has an elongated bore 59 which terminates in counterbore 61, defining shoulder 63, against which registers the compression spring 65. Said spring is nested within the metering pin and extends outwardly through and operatively engages the end portion of the piston rod, normally biasing the piston rod to the outer-most position shown in FIG. 2.

The metering pin has a radial bleed passage 67 therethrough in registry with the adjustable orifice element 69 which is rotatively adjusted within the outer end of the metering pin and its head and held in position by the snap ring 71 in said head. A transverse slot 73, FIG. 3, upon the end face of the orifice element provides a means for rotary adjustment thereof.

The inner end of the orifice element includes a valve 75, also shown in FIG. 4, to define a variable orifice return chamber or passage at 77, in registry with bleed passage 67 in the blind end of said body, extending through the wall of the metering pin. Set screw 79 is threaded through the orifice element and is adapted to operatively engage the head of the metering pin for securing the orifice element in the desired adjusted position, as shown in FIG. 3.

There is provided upon the end face of the head 53 a dial with indicia 81. A corresponding arrow 83 is stamped into the end face of the orifice element at the transverse slot 73 therein, adapted for selective registry with the indicia 1, 2, 3, 4, 5 and 6.

Referring to the illustration of the valve element 75, FIG. 4, forming a part of the orifice device, it is seen upon rotation of the orifice element that the size of the orifice passage or return chamber 77 may be varied. It is at its maximum opening, as shown in FIGS. 3 and 4, with the arrow in registry with the numeral 6 for maximum liquid flow through bleed passage 67 into the passage 77 and into and through the bore of the metering pin. The orifice element may be rotated selectively to any of the other positions, such as the number 1 position, corresponding to minimum liquid flow.

This construction provides a means to regulate the extent of bleeding of liquid from bore 21 as the piston and piston rod assembly is retracted under load. It appears from FIG. 4 that the valve element 75 is eccentric upon and with respect to the axis of the orifice element, so that rotation thereof and setting will regulate the size of the chamber 77 and, in turn, the quantity of oil or other liquid flow into the metering pin bore.

As shown in FIG. 2, the bore 21, the bore 59 of the metering pin, the piston and piston rod are full of liquid, such as oil, for example, though other fluids are contemplated as possible to use.

OPERATION

With a shock absorber secured into a threaded acceptable mounting position at 17, FIG. 1, and locked into place by jam nut 19, and assuming a moving mass containing a load were to contact piston rod end cap 43, it will force the piston 33 into the fluid in bore 21. This will cause float valve 39 to close. This allows the fluid to be metered around the metering pin which is protruding into the bore of piston 31 and also to be metered through the passage 67 at the bottom end of the metering pin. Fluid flows through said passage as allowed by the adjustment of orifice 69. As the piston continues to be depressed into the fluid, the tapered metering pin gradually closes due to its taper, creating a greater fluid flow through the passage 67 and across the metering orifice as adjusted to bring a particular load to a smooth, cushioned stop by dissipation of kinetic energy.

The fluid is directed to chamber 23 by flowing through the metering pin and through the ports 47 in the piston rod which connects the counterbore, filling chamber 23 full of fluid, somewhat compressing foam 18. Such compressing places a limited pre-load on the liquid in said counterbore, piston and metering pin.

When the load is removed from end cap 43, spring 65 forces the piston to return to a normal position, FIG. 2, with fluid now flowing through the piston rod passages 35 in the opposite direction, opening float valve 39 allowing the chamber between the blind end and the piston to be completely filled with fluid. The piston comes to rest again against snap ring 37.

I claim:

1. A shock absorber comprising a body having a bore and a counterbore;
a piston having an axial opening and a plurality of bleed passages between said bore and counterbore;
said piston being movable within said bore and including a hollow piston rod extending through said counterbore and axially outward of said body, said rod having a plurality of radial ports between the piston opening and said counterbore;
an end cap on said rod adapted to be engaged by a moving mass toward the end of a longitudinal stroke;
a float valve in said bore movable upon said piston in registry with said passages closing same on retraction of said piston and opening said passages on forward return movement of said piston, permitting flow of liquid from said counterbore to said bore;
an axially apertured metering pin in said bore at one end having a head closing off and anchored within said bore, and adjacent thereto a transverse bleed passage between said bore and the aperture of the metering pin; the other end of said metering pin extending into said piston and piston rod;
a coiled spring interposed between said metering pin and piston rod normally biasing said rod outwardly of the body;
an adjustable orifice element eccentrically mounted in said metering pin in registry with said transverse bleed passage to variably regulate fluid flow from said bore into said metering pin, said bore, metering pin, piston and piston rod being completely filled with liquid; whereby on retraction of said piston rod over said pin, displaced liquid from said bore passes through the metering pin into said piston and piston rod and through its radial ports to said counterbore;
said adjustable orifice element being sealed and rotatably adjustable in said metering pin head and having a valve element to variably regulate the size of a return chamber between said metering pin passage and metering pin bore, to provide for a preadjusted return flow of liquid into and through said metering pin;
and a sleeve of resilient foam plastic material nested in said counterbore, the liquid flowing into said counterbore compressing said sleeve, preloading the liquid in said counterbore, piston and metering pin.

2. In the shock absorber of claim 1, said adjustable orifice element having a transverse slot in its end face for rotary adjustment thereof to permit manual rotation of the orifice element, regulating said return flow.

3. In the shock absorber of claim 1, said metering pin being tapered longitudinally of reducing diameter towards its free end; whereby on initial retraction of the piston, metering of liquid around said metering pin and into said radial ports is a minimum and is gradually increased restricting liquid flow as said piston retracts along the increasing diameter of said metering pin to provide a gradual and uniform cushioned deceleration of the mass engaging said end cap.

* * * * *